(12) United States Patent
Kubota

(10) Patent No.: US 6,496,482 B1
(45) Date of Patent: Dec. 17, 2002

(54) CONNECTION SETTING METHOD FOR USE IN NETWORK

(75) Inventor: Yuji Kubota, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/256,612

(22) Filed: Feb. 23, 1999

(30) Foreign Application Priority Data

May 22, 1998 (JP) ............................................ 10-141101

(51) Int. Cl.$^7$ ........................ G06F 15/16; H04L 12/28
(52) U.S. Cl. ...................... 370/250; 370/400; 709/208; 709/223
(58) Field of Search ................................. 370/248, 250, 370/252, 395.2, 400, 410; 709/208, 211, 217, 227, 229, 230, 231, 238, 223, 224; 340/3.1, 3.21, 3.41

(56) References Cited

U.S. PATENT DOCUMENTS

| | | | | |
|---|---|---|---|---|
| 4,893,340 A | * | 1/1990 | Lubarsky et al. ............ | 709/208 |
| 5,058,163 A | * | 10/1991 | Lubarsky et al. ............ | 370/465 |
| 6,134,234 A | * | 10/2000 | Kapanen ...................... | 709/208 |
| 6,209,039 B1 | * | 3/2001 | Albright et al. ............. | 709/208 |

FOREIGN PATENT DOCUMENTS

JP        4-151933        5/1992

* cited by examiner

*Primary Examiner*—Alpus H. Hsu
*Assistant Examiner*—Afsar M. Qureshi
(74) *Attorney, Agent, or Firm*—Katten, Muchin, Zavis, Rosenman

(57) ABSTRACT

The present invention relates to the art of making a connection between communication terminals, taking a quality of service (QoS) into consideration in a network formed by interconnection among a plurality of switches (element units) accommodating the communication terminals. A network monitoring control system for monitoring and controlling the whole network selects element units constituting a path for making a connection on the basis of connection setting request information, including quality information on the connection to be set up and outputted from the connection-requesting side communication terminal, and, under the control of the network monitoring control system, an element monitoring control system, for monitoring and controlling one of the selected element units as its object, controls the object element unit in cooperation with an element monitoring control system for monitoring and controlling another one of the element units, forming a part of the path and adjacent to the object element unit. The network monitoring control system is made to evaluate the result of connection setting control by the element monitoring control systems to judge whether or not it meets the quality information as a whole.

12 Claims, 7 Drawing Sheets

CONNECTION SETTING METHOD FOR USE IN NETWORK

BACKGROUND OF THE INVENTION (1) Field of the Invention

The present invention relates to the art of a connection setting method for use in a network, which is suitable for when a connection is made between communication terminals in a network defined by interconnection among a plurality of switches accommodating the communication terminals.

To put it concretely, this invention relates to the art of a network connection setting method suitable for when, while consideration is given to a quality of service (QoS) as to cell loss, cell transmission delay and others, a connection is established between the communication terminals in a network, for example, employing the asynchronous transfer mode (ATM) on broadband aspects of ISDN (B-ISDN).

(2) Description of the Related Art

In recent years, for the purpose of transferring multimedia information comprising a plurality of types of information such as voices, data and pictures at a high speed through the use of one network, research and development have noticeably advanced for an ATM network, employing asynchronous transfer mode (ATM).

This ATM network is established with the interconnection among a plurality of switches allowed to accommodate communication terminals, and although being already placed into practical use, there is a further need to establish a method of efficiently making the most of network resources or a method of making a connection meeting a requirement efficiently at a high speed for the improvement of a quality of service, (QoS requirement).

Meanwhile, the TINA (Telecommunication Information Networking Architecture) has been proposed as a network architecture leading the following generation.

The TINA is made in such a manner that, through a control network to a communication network created by interconnecting a plurality of switches accommodating communication terminals, there are connected a control system functioning as an EML-CP (Element Management Layer-Connection Perform) for monitoring and controlling each of the plurality of switches and a control system functioning as an NML-CP (Network Management Layer-Connection Perform) for monitoring and controlling the whole network.

The functions of the NML-CP and EML-CP can be distributed to a plurality of control systems through the use of, for example, a distributively computing technique represented by the CORBA (Common Object Request Broker Architecture & specification) or the like.

In this TINA, the employment of the ATM network as the communication network has been in examination.

There is a problem which arises with the TINA, however, in that there is no establishment of a method of efficiently making the most of network resources or a method of making a connection meeting the QoS requirement efficiently at a high speed, for that the relationship between the NML-CP and the EML-CP and the functional distribution therebetween still remain undefined clearly.

SUMMARY OF THE INVENTION

The present invention has been developed with a view to eliminating this problem, and it is therefore an object of this invention to provide a connection setting method for use in a network, a network monitoring control system and an element monitoring control system, coupled with a computer-readable record medium retaining a network monitoring control program and a computer-readable record medium retaining an element monitoring control program, which are capable of making clear the relationship between an NML-CP and an EML-CP and the functional distribution therebetween to set a connection meeting the QoS requirement efficiently at a high speed while making the most of network resources efficiently.

For this purpose, in accordance with this invention, there is provided a network connection setting method in which, in a network produced by interconnection among a plurality of element units accommodating communication terminals, for making a connection between the communication terminals, a network monitoring control system, for monitoring and controlling the whole network, selects the element units constituting a path for setting up the connection, on the basis of a connection setting request information, including quality information about the connection to be set up and outputted from the communication terminal requesting the connection, and an element monitoring control system, for monitoring and controlling one of the selected element units, under control of the network monitoring control system as its object, secures a resource for making said connection in cooperation with an element monitoring control system for monitoring and controlling another one of the selected element units, which is a part of the path and is adjacent to said object element unit, and controls the object element unit through the resource for setting up the connection, and the network monitoring control system evaluates the result of connection setting control by the element monitoring control systems to judge whether or not it meets the quality information as a whole.

To put it concretely, in accordance with this invention, there is provided a network connection setting method in which, in a network produced by interconnection among a plurality of element units accommodating communication terminals, for making a connection between the communication terminals, the communication terminal requesting a connection outputs, to a network monitoring control system for monitoring and controlling the whole network, connection setting request information, including identification information on the connection-requesting side communication terminal and the connection-accepting side communication terminal and quality information on the connection to be set up, the network monitoring control system receives the connection setting request information and selects the element units constituting a path for setting up the connection on the basis of the identification information on the connection-requesting side and connection-accepting side communication terminals, included in the connection setting request information and, further, outputs, to an element monitoring control system for monitoring and controlling one of the selected element units as its object, in-element-unit connection setting request information, including identification information on another element unit adjacent to the object element unit and quality information on the connection to be set up, and the element monitoring control system, for monitoring and controlling the object element units, receives the in-element-unit connection setting request information from the network monitoring control system, secures a resource for setting up the connection meeting the quality information in cooperation with an element monitoring control system for monitoring and controlling the element unit adjacent to the object element unit, and controls the element unit for setting up the connection through the secured resource, and the network monitoring control system receives the result of connection setting control by the element monitoring control units and evaluates the result of connection setting control to judge whether or not it meets the quality information as a whole.

At this time, if judgment is made that the result of connection setting control by the element monitoring control systems does not wholly meet the aforesaid quality information, the network monitoring control unit can also reselect element units constituting the aforesaid path.

In addition, in accordance with this invention, there is provided a network monitoring control system for monitoring and controlling the whole network formed by interconnection among a plurality of element units accommodating communication terminals, comprising a connection setting request information receiving section for receiving connection setting request information, including identification information on the connection-requesting side communication terminal and the connection-accepting side communication terminal and quality information on the connection to be set up from the connection-requesting side communication terminal, a selecting section for selecting the element units constituting a path for setting up the connection on the basis of the identification information on the connection-requesting side communication terminal and the connection-accepting side communication terminal included in the connection setting request information received by the connection setting request information receiving section, a request information outputting section for outputting, to an element monitoring control system for monitoring and controlling one of the element units selected by the selecting section as its object, in-element-unit connection setting request information, including identification information on another one of the selected element units adjacent to the object element unit and further including the quality information on the connection to be set up, and an quality evaluating section for receiving a connection setting control result from the element monitoring control systems receiving the in-element-unit connection setting request information from the request information outputting section, to make judgment on whether or not the connection setting control result meets the quality information included in the connection setting request information as a whole.

In this case, the selecting section comprises a physical connection information retaining table for retaining information on a physical connection relationship between the plurality of element units in the network, and a determining section for referring to the physical connection information retaining table on the basis of the identification information on the connection-requesting side and connection-accepting side communication terminals included in the connection setting request information for determining the element units to be selected, constituting the path for setting the connection.

At this time, the determining section can also determine the element units to be selected taking into consideration the condition for determining the path.

In addition, in the case that the quality evaluating section makes judgment that the connection setting control result does not meet the quality information as a whole, the selecting section can also reselect element units constituting the path.

Moreover, in accordance with this invention, there is provided an element monitoring control system for, in a network formed by interconnection among a plurality of element units accommodating communication terminals, monitoring and controlling at least one of the plurality of element units as its object, comprising a request information receiving section for, if the object element unit is selected as an element unit constituting a path for making a connection between the communication terminals, receiving, from a host system, an in-element-unit connection setting request information, including identification information on another element unit constituting the path and adjacent to the object element unit and further including quality information on the connection to be set up, a resource securing section for securing a resource needed for setting up the connection meeting the quality information on the basis of the request information received by the request information receiving section in cooperation with an element monitoring control system for monitoring and controlling the adjacent element unit, a connection setting control section for controlling the object element unit to set up the connection through the use of the resource secured by the resource securing section, and an informing section for informing the host system of the result of connection setting control by the connection setting control section.

In this case, the resource securing section is made up of an adjacent element unit connection information retaining table for retaining identification information on another element unit adjacent to the object element unit, identification information on the element monitoring control system for controlling the adjacent element unit and identification information on a connecting place for making a physical connection between the object element unit and the adjacent element unit, a state managing section for grasping and managing a state of the object element unit, a resource candidate determining section for referring to the adjacent element unit connection information retaining table and the result of management by the state managing section, on the basis of the request information received by the request information receiving section, to determine a candidate for a resource for setting up the connection corresponding to the quality information, and a cooperation-with-adjacent-element-unit control section for referring to the adjacent element unit connection information retaining table, on the basis of the request information received by the request information receiving section to determine an element monitoring control system capable of monitoring and controlling the adjacent element unit on the connection-accepting side, and for determining a resource for setting up the connection corresponding to the quality information in cooperation with the adjacent element monitoring control system on the basis of the result of determination by the resource candidate determining section.

Furthermore, in accordance with this invention, there is provided a computer-readable record medium retaining a network monitoring control program for monitoring and controlling, through a computer, the whole network formed by interconnection among a plurality of element units accommodating communication terminals, wherein the network monitoring control program makes the computer function as a connection setting request information receiving section for receiving connection setting request information, including identification information on one of the communication terminals requesting a connection and another one of the communication terminals accepting the connection and quality information on the connection to be set up from the connection-requesting side communication terminal, a selecting section for selecting element units constituting a path for setting up the connection on the basis of the identification information on the connection-requesting side communication terminal and connection-accepting side communication terminal included in the connection setting request information received by the connection setting request information receiving section, a request information outputting section for outputting, to an element monitoring control system for monitoring and controlling one of the element units selected by the selecting section as its object, in-element-unit connection setting request information, including identification information on the element unit adjacent to the object element unit and further including the quality information on the connection to be set up, and an quality evaluating section for receiving a connection setting control result from the element monitoring control systems receiving the in-element-unit connection setting request information from the request information outputting section, to make judgment on whether or not the connection setting control result meets the quality information included in the connection setting request information as a whole.

Still further, in accordance with this invention, there is provided a computer-readable record medium retaining an element monitoring control program for, in a network formed by interconnection among a plurality of element units accommodating communication terminals, monitoring and controlling, through a computer, at least one of the plurality of element units as its object, wherein the element monitoring control program makes the computer function as a request information receiving section for, in the case that the object element unit is selected as an element unit constituting a path for making a connection between the communication terminals, receiving, from a host system, an in-element-unit connection setting request information, including identification information on another element unit constituting the path and adjacent to the one element unit and further including quality information on the connection to be set up, a resource securing section for securing a resource needed for making the connection meeting the quality information on the basis of the request information, received by the request information receiving section, in cooperation with element monitoring control systems for monitoring and controlling the adjacent element unit, a connection setting control section for controlling the object element unit to set up the connection through the use of the resource secured by the resource securing section, and an informing section for informing the host system of the result of connection setting control by the connection setting control section.

Thus, according to this invention, the network monitoring control system monitors and controls the whole network, and selects the element units constituting the path for setting up the connection, so that the efficient utilization of the network resources becomes feasible. In addition, the element monitoring control system controls the object element unit in cooperation with the element monitoring control system for monitoring and controlling the element unit adjacent to the first-mentioned element unit this element monitoring control system controls, and therefore, it is possible to improve the parallel processing to be conducted by the element monitoring control system. Accordingly, this arrangement offers an advantage in setting up the connection meeting the Qos requirement efficiently at a high speed.

DESCRIPTION OF THE PREFERRED EMBODIMENTS

An embodiment of the present invention will be described hereinbelow with reference to the drawings.

Figure 1:
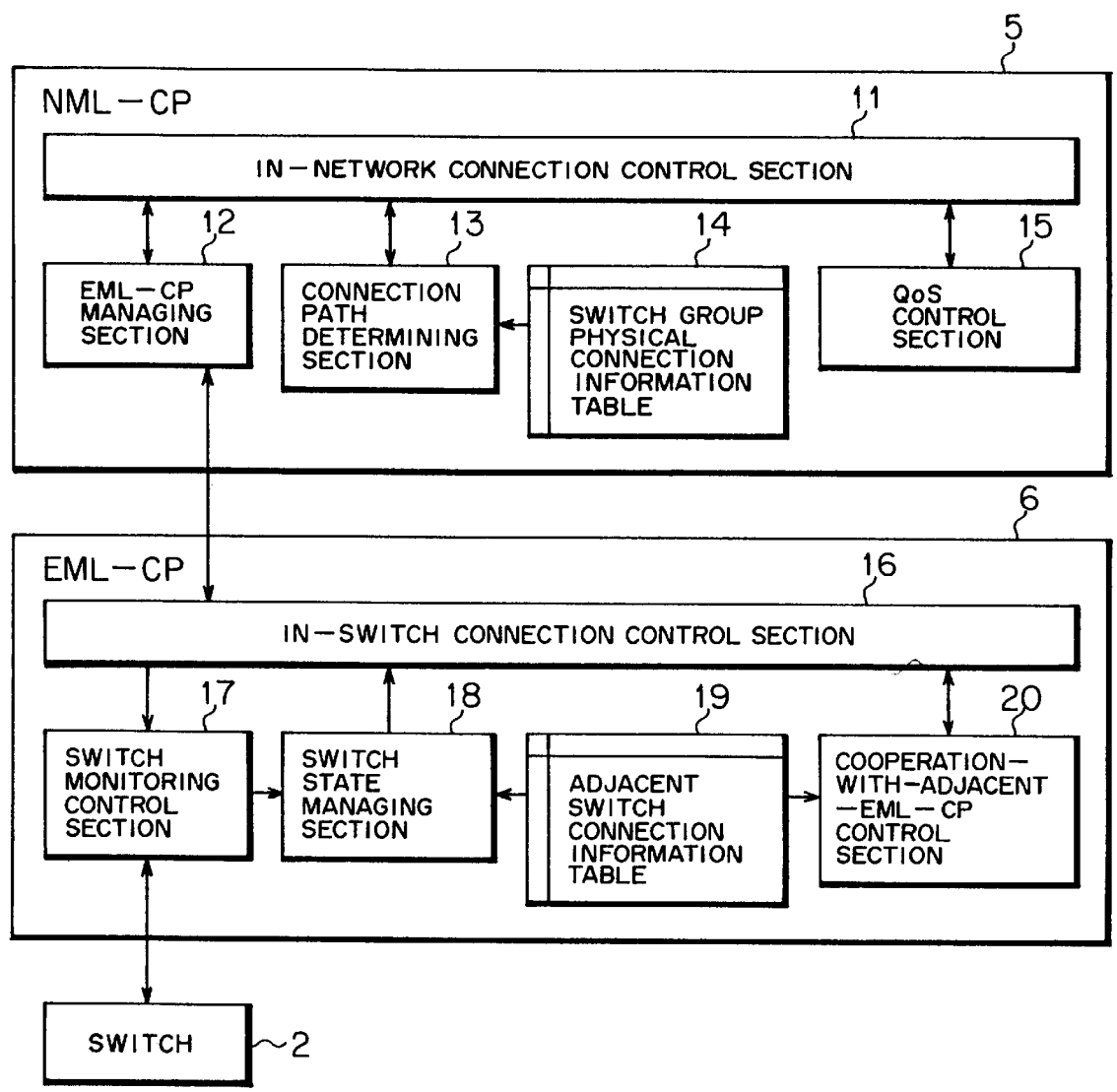
FIG. 1 is a functional block diagram showing arrangements of a network monitoring control system and an element monitoring control system according to an embodiment of the present invention.
Figure 2:
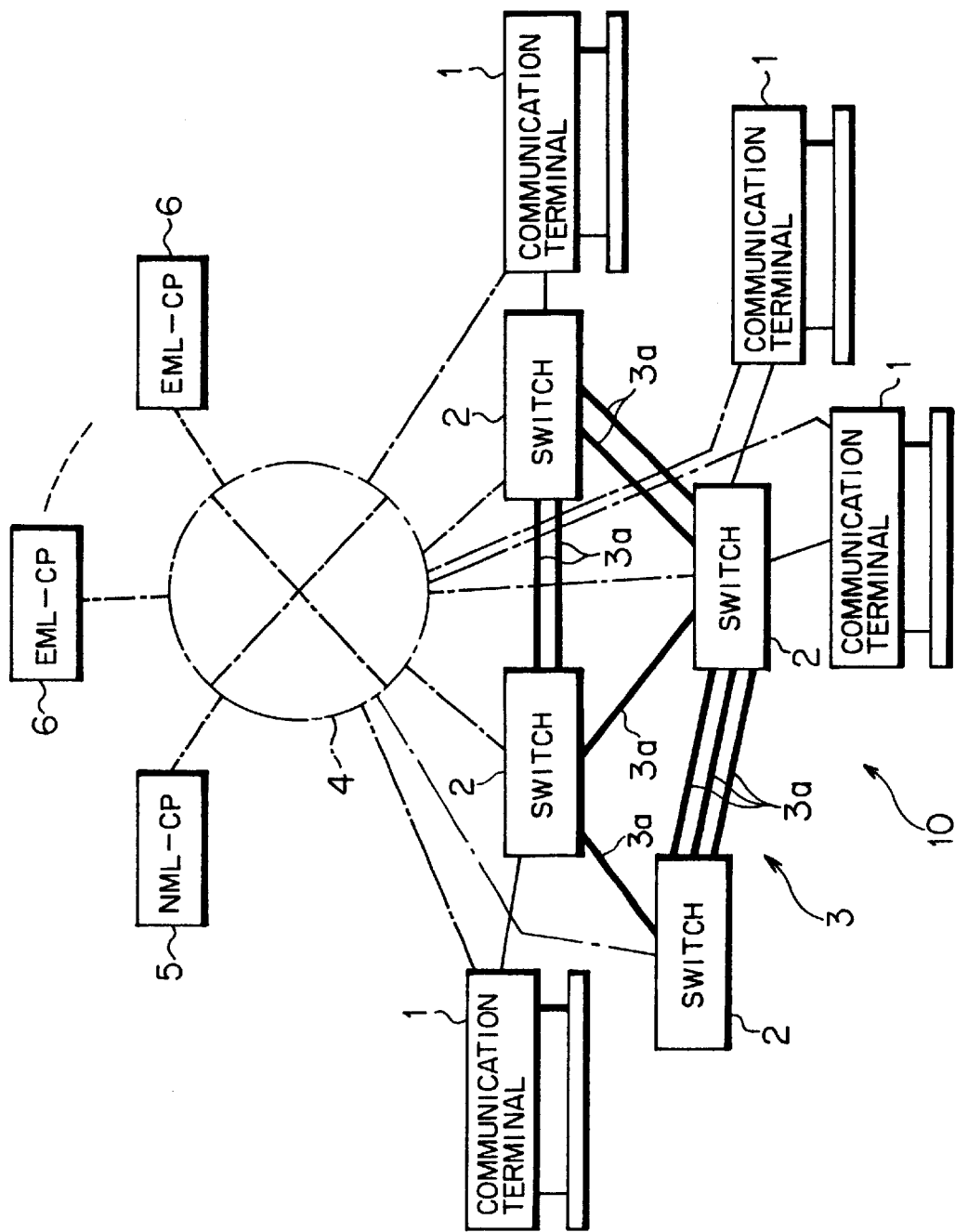
FIG. 2 illustratively shows an arrangement of a network based upon the network monitoring control system and the element monitoring control systems according to the embodiment of this invention.

FIG. 1 is a functional block diagram showing arrangements of a network monitoring control system and element monitoring control system according to an embodiment of this invention, and FIG. 2 illustratively shows an arrangement of a network to which applied are the network monitoring system and the element monitoring control systems.

In FIG. 2, a network, generally designated at numeral 10, is similar to the TINA mentioned before, and is formed in a manner that, through a control network 4 to a network 3 made by interconnecting a plurality of switches (element units) 2 accommodating communication terminals 1 through connection cables 3a, there are coupled element monitoring control systems 6, functioning as an EML-CP (Element Management Layer-Connection Perform) to monitor and control each of the switches 2, and a network monitoring control system 5, serving as an NML-CP (Network Management Layer-Connection Perform) to monitor and control the whole network 10. In the following description, the element monitoring control system will be referred to as the EML-CP 6 while the network monitoring control system will be referred to as the NML-CP 5.

Furthermore, each of the communication terminals 1 is designed to, for the purpose of achieving intercommunication with a different communication terminal(s) 1, send an end-to-end connection setting request toward the NML-CP 5 through the network 3 and the control network 4 and, further, receive a notification regarding the result of-control by the switches 2 from the NML-CP 5 therethrough.

Figure 3:
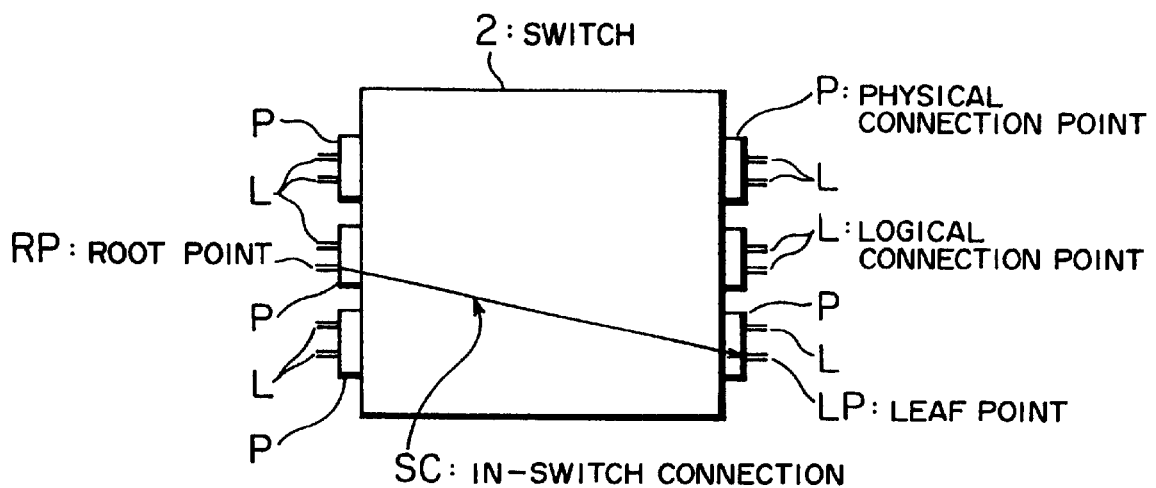
FIG. 3 illustratively shows a construction of a switch.

Each of the switches 2 is, as shown in FIG. 3, equipped with a plurality of physical connection points P each having a plurality of logical connection points L.

When the switch 2 undergoes the control by the EML-CP 6 as will be described herein later, the logical connection points L are defined within each of the physical connection points P, and an in-switch connection SC acting as a communication path is established between the logical connection point L [Root Point (RP)] forming the start point of the connection and the logical connection point L [Leaf Point (LP)] forming an end point of the connection.

In this embodiment, both the NML-CP 5 and the EML-CP 6 are for executing the connection setting control between the communication terminals 1 while taking the QoS requirement into consideration, and are made to give and take a signal from/to a different control system (NML-CP 5 or EML-CP 6) and a switch 2 through the control network 4.

Figure 4:
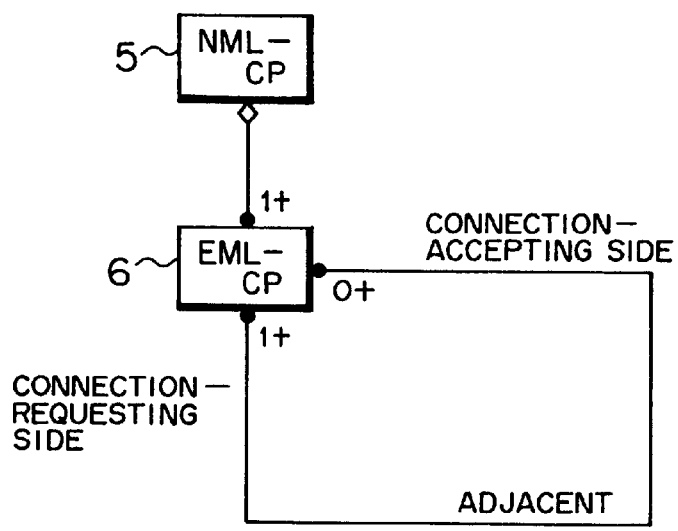
FIG. 4 is an illustration of the relationship between an NML-CP and an EML-CP.

FIG. 4 is an illustration of the relationship between the NML-CP 5 and the EML-CPs 6 according to the OMT (Object Management Technology) notation. FIG. 4 shows that the NML-CP 5 has reference to a plurality of EML-CPs 6, and it also shows that, on the basis of the relationship in connection between an object switch 2, which is controlled by a selected one EML-CP 6, and another switch 2, which is adjacent to and physically connected with the object switch 2, the EML-CP 6 has reference to another EML-CP (adjacent or neighboring EML-CP) 6 for monitoring and controlling the adjacent switch 2.

That is, the EML-CP 6 is for monitoring and controlling each of the switches 2 in the network shown in FIG. 2 as mentioned previously, and is, as shown in FIG. 1, made up of an in-switch connection control section 16, a switch monitoring control section 17, a switch state managing section 18, an adjacent switch connection information table 19 and a cooperation-with-adjacent-EML-CP control section 20.

In this arrangement, the in-switch connection control section 16 is for generally controlling the switch monitoring control section 17, the switch state managing section 18 and the cooperation-with-adjacent-EML-CP control section 20 to accomplish the setting control for the in-switch connection SC.

In addition, this in-switch connection control section 16 functions as a request information receiving section to receive an in-switch connection setting processing request (in-element-unit connection setting request information), which will be described herein later, from the EML-CP 5 serving as a host system, and further, functions as an informing section to inform the NML-CP 5 of the result of the in-switch connection SC setting control by the switch monitoring control section 17 as an in-switch connection setting processing result notification.

The aforesaid in-switch connection setting processing request includes identification information (identification number) on another switch 2, which is adjacent to the switch 2 and selected by the NML-CP 5 as will be mentioned later, used for establishing a path for making a connection between the communication terminals 1 and monitored and controlled by the EML-CP 6, and further, includes quality information (QoS requirement) on the connection to be set up.

The in-switch connection setting processing result notification signifies the notification on the result of the connection setting control depending upon the aforesaid in-switch connection setting processing request (as to whether a desired in-switch connection SC is set up or not, about the QoS regarding a cell loss, cell transmission delay of the in-switch connection SC which is set up, or the like).

Furthermore, the switch monitoring control section 17 is for monitoring the variation of the state of the object switch 2 and, further, for outputting the in-switch connection setting processing request to this switch 2 to execute the control for setting up the in-switch connection SC (the control for setting up the connection through the use of a resource secured by the switch state managing section 18 which will be mentioned later), that is, functioning as a connection setting control section.

The adjacent switch connection information table 19 is made out to retain identification information (identification number) on the aforesaid adjacent switch 2, identification information (identification number) on the EML-CP 6 for monitoring and controlling the adjacent switch 2, and identification information on the logical connection point L (see FIG. 3) being the connecting spot at which the switch 2 to be controlled and the adjacent switch 2 are physically coupled to each other, that is, functioning as an adjacent element unit connection information retaining table.

The data structure of the information retained in the adjacent switch connection information table 19 is as follows.
<Adjacent Switch Connection Information>
   =<Adjacent Switch Connection Information Record Group>
<Adjacent Switch Connection Information Record Group>
   =<Adjacent Switch Connection Information Record>+
     <Adjacent Switch Connection Information Record Group>
<Adjacent Switch Connection Information Record>
   =<Connection-Accepting Side Information>+<Switch Connection Point>
<Connection-Accepting Side Information>
   =(<Terminal Identifier>+NULL)|(<Switch Identifier>+ <EML-CP Identifier>)
<Terminal Identifier>
   =Natural Number
<Switch Identifier>
   =Natural Number
<EML-CP Identifier>
   =Identifier whereby EML-CP is singly recognizable on ORB
<Switch Connection Point>
   =Identifier for Physical Connecting Spot between Switches or between Switch and Terminal Furthermore, the switch state managing section 18 is for grasping and managing the state (for example, a band using state, a cell loss state, a cell delay state, and others) of the switch 2 monitored by the switch monitoring control section 17 as will be described herein later, that is, it functions as a state managing section.

The cooperation-with-adjacent-EML-CP control section 20 is for determining the EML-CP 6 which can monitor and control the switch 2 adjacent to the switch 2 being controlled to secure resources on both sides of the switch 2 being controlled and on both sides of the adjacent switch 2 (logical connection point L) in cooperation with the determined EML-CP 6 (concretely, the cooperation-with-adjacent-EML-CP control section 20 of the determined EML-CP 6).

Accordingly, the cooperation-with-adjacent-EML-CP control section 20 functions as a resource determining section, which receives the in-switch connection setting processing request accepted by the in-switch connection control section 16 and, referring to the adjacent switch connection information table 19 and the management result in the switch state managing section 18, determines a physical connection point P of the switch 2 being controlled and a logical connection point L within the same physical connection point P as candidates for resources for making a connection satisfying the QoS requirement.

In addition, in answer to the in-switch connection setting processing request taken by the in-switch connection control section 16, this cooperation-with-adjacent-EML-CP control section 20 also functions as a cooperation-with-adjacent-element-unit control section to additionally refer to the aforementioned adjacent switch connection information table 19 to determine the EML-CP 6 which can monitor and control the adjacent switch 2 forming the connection-accepting side switch, and further to determine a resource for making a connection meeting the QoS requirement in cooperation with the connection-accepting side EML-CP 6 on the basis of the resource candidate determination result.

That is, in order to establish a connection between the switch 2 being controlled and the adjacent switch 2, the switch state managing section 18, the adjacent switch connection information table 19 and the cooperation-with-adjacent-EML-CP control section 20 serve as a resource securing section to secure a resource (a physical connection point P and a logical connection point L within the physical connection point P) for making a connection meeting the QoS requirement in cooperation with the EML-CP 6 for monitoring and controlling the adjacent switch 2 on the basis of the in-switch connection setting processing request received by the in-switch connection control section 16.

Meanwhile, the NML-CP 5 takes charge of controlling the whole network 10 shown in FIG. 2 as mentioned previously, and is composed of an in-network connection control section 11 an EML-CP managing section 12, a connection path determining section 13, a switch group physical connection information table 14 and a QoS control section 15 as shown in FIG. 1.

The in-network connection control section 11 is for generally controlling the EML-CP managing section 12, the connection path determining section 13 and the QoS control section 15 in order to carry out connection setting control in the network.

In addition, this in-network connection control section 11 receives, from the connection-requesting side communication terminal 1, a connection setting processing request (connection setting request information) including identification information (identification numbers of the communication terminals 1) on the connection-requesting side and connection-accepting side communication terminals 1 and quality information (QoS requirement) on the connection to be set up, that is, functioning as a connection setting request information receiving section.

The EML-CP managing section 12 functions as a request information outputting section to output the aforesaid in-switch connection setting processing request (in-element-unit connection setting request information) toward all the EML-CPs 6 capable of monitoring and controlling the switches 2 selected by the connection path determining section 13 as will be mentioned later, and further, serves as a processing result notification receiving section to receive a connection setting processing result notification from these EML-CPs 6.

The switch group physical connection information table 14 is for retaining information indicative of the physical connection relationship among the plurality of switches 2 in the network 10 (this information is representative of only the physical connection relationship itself among the plurality of switches 2, but not including information indicative of the connection relationship with the aforesaid physical connection point P), that is, functioning as a physical connection information retaining table.

Besides, the data structure of the information to be retained in the switch group physical connection information table 14 is as follows.

<Switch Group Physical Connection Information>
 =<Physical Path Information Record Group>
<Physical Path Information Record Group>
 =<Physical Path Information Record>+<Physical Path Information Record Group>
<Physical Path Information Record>
 =<Both-End Information>+<Relay Switch Group>
<Both-End Information>
 =<Start Point Information>+<End Point Information>
<Start Point Information>
 =<Terminal Identifier>+<Switch Identifier>
<End Point Information>
 =<Terminal Identifier>+<Switch Identifier>
<Terminal Identifier>
 =Natural Number
<Relay Switch Group>
 =<Switch Identifier>+<Relay Switch Group>
<Switch Identifier>
 =Natural Number Moreover, the connection path determining section 13, when receiving a connection setting processing request from the communication terminal 1 by way of the in-network connection control section 11, refers to the aforesaid switch group physical connection information table 14 to grasp only the physical connection relationship between the switches 2 for the selection of a group of switches needed for the connection (switches 2 for constituting a path for making a connection).

That is, the connection path determining section 13 is designed to refer to the switch group physical connection information table 14 on the basis of the identification information on the connection-requesting side and connection-accepting side communication terminals 1 included in the connection setting processing request for determining the switches 2 to be selected for making a path for establishing the connection, that is, it functions as a determining section.

Besides, the connection path determining section 13 is made to determine the switches 2 to be selected while consideration is given to the conditions or terms to be taken at the determination of the aforesaid path (for example, setting the connection with the shortest path, setting the connection with a path providing less traffic).

That is, the connection path determining section 13 and the switch group physical connection information table 14 function as a selecting section to select the switches 2 for constituting a path for making a connection on the basis of the identification information on the connection-requesting side and connection-accepting side communication terminals 1 included in the connection setting processing request taken by the EML-CP managing section 12.

The QoS control section 15 receives the aforesaid in-switch connection setting processing result notification from all the EML-CPs 6 for monitoring and controlling the selected switches 2 (all the EML-CPs 6 to which the in-switch connection setting processing request is inputted from the EML-CP managing section 12) by way of the EML-CP managing section 12 to judge whether or not the result of the in-switch connection SC setting control meets the QoS requirement included in the connection setting processing request from the communication terminal 1 as a whole, that is, it functions as a quality evaluating section.

Since, as mentioned before, the in-switch connection setting processing result notification includes information about the QoS regarding the cell loss, cell transmission delay and others of the set in-switch connection SC, the QoS control section 15 is made to decide and evaluate whether or not the sum of the cell loss, cell transmission delay and others of the in-switch connection SC by all the EML-CP 6 meets the QoS requirement included in the connection setting processing request.

Furthermore, in the EML-CP 6, if the QoS control section 15 makes judgment that the result of the aforesaid in-switch connection SC setting control does not meet the QoS requirement as a whole, the connection path determining section 13 re-selects the switches 2 for constituting the aforesaid path.

In fact, the functions of the aforesaid NML-CP and EML-CP are realized as an operation of an CPU (not shown)

in a manner that, in each of the control systems (computers) 5, 6, programs [an NML-CP program (network monitoring control program) and an EML-CP program (element monitoring control program)] put on a record medium such as a disk unit or a CD-ROM (both are not shown) are read out and placed on a memory (RAM, not shown) to be run in the CPU.

The NML-CP program is for monitoring and controlling, through a computer, the whole network 3 produced by interconnection among the plurality of switches 2 accommodating the communication terminals 1, and runs the computer as the in-network connection control section 11, the EML-CP managing section 12, the connection path determining section 13 and the QoS control section 15.

On the other hand, the EML-CP program is for monitoring and controlling, through the computer, at least one of the plurality of switches 2 in the network 3, and runs the computer as the in-switch connection control section 16, the switch monitoring control section 17, the switch state managing section 18 and the cooperation-with-adjacent-EML-CP control section 20.

In general, the NML-CP program and the EML-CP program are recorded on, for example, a CD-ROM, and for use, are installed from the CD-ROM or the like to the aforesaid disk unit or the like in the computer.

Moreover, in this embodiment, the functions of NML-CP and EML-CP are distributed to a plurality of control systems (computers) 5, 6 through the use of a distributively computing technique represented by a CORBA (Common Object Request Broker Architecture & specification) being the standard specification for an ORB (Object Request Broker) or the like.

Figure 5:
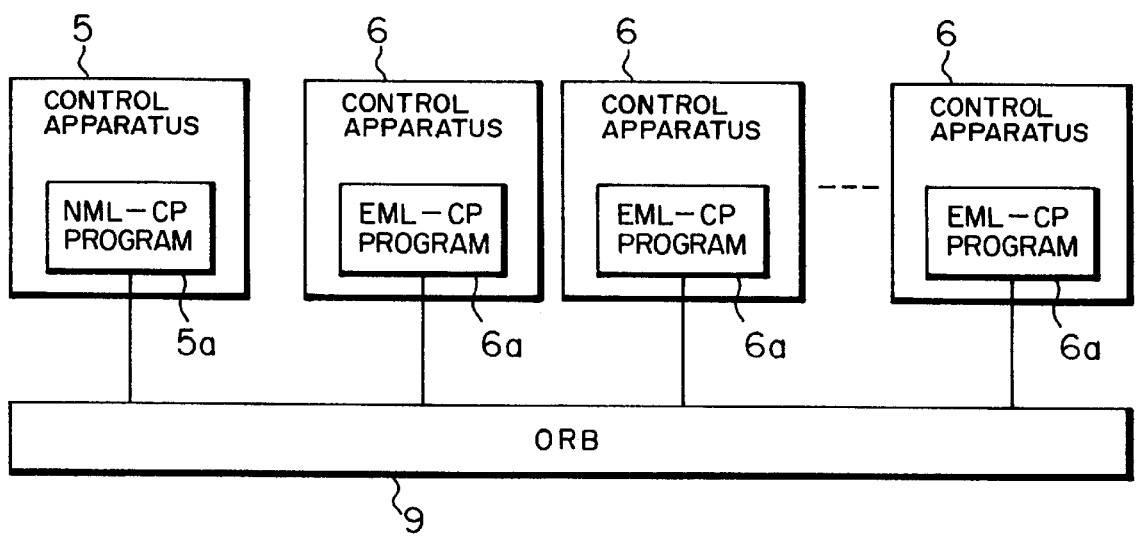
FIG. 5 is an illustration of a state where the functions of the NML-CP and the EML-CP are distributed to a plurality of control systems.

FIG. 5 is an illustration of a state where the functions of NML-CP and EML-CP are distributed to a plurality of control systems 5, 6.

As shown in FIG. 5, the aforesaid NML-CP program, designated at numeral 5a, is stored in a disk unit (not shown) or the like in the control system 5, while the aforesaid EML-CP program, denoted at numeral 6a, is recorded in a disk unit (not shown) or the like in the control systems 6. Each of the control systems 5, 6 is put on the ORB (Object Request Broker) 9 forming a middle ware based upon the CORBA.

The ORB 9 is for the purpose of concealing the actual communication processing from the applications (NML-CP program 5a and EML-CP programs 6a). This allows the NML-CP 5 and the EML-CP 6 to mutually cooperate with each other in operation on the network 10 without the execution of communication protocol control.

Furthermore, expressed with the IDL (Interface Definition Language) defined by CORBA, an external interface for the EML-CP allowing the mutual communication between the EML-CP 6 and the NML-CP 5 is as follows.

TABLE 1

```
Struct Connection Point {
    short port;           // Port Number
    short vpi;            // VPI (Virtual Path Identifier)
    short vci;            // VCI (Virtual Channel Identifier)
};
Struct QoS {
    short Bandwidth;      // Transmission Band
    short Rejected Cell;  // Rate of Cell Loss
};
interface EML-CP
{
// Connection Establishment Operation
```

TABLE 1-continued

```
short Setup Connection(
    in short Connection ID;         // In-network Connection
                                    Identifier
    in short Root Switch,           // Connection-Requesting
                                    Side Switch Identifier
    in short Leaf Switch,           // Connection-Accepting Side
                                    Switch Identifier
    in QoS Req QoS,                 // QoS Condition of
                                    Connection Generation Request
    out Connect Point Root Point,   // Connection Point of
                                    Connection-Requesting
                                    Side Switch
    out Connect Point Leaf Point,   // Connection Point of
                                    Connection-Accepting
                                    Side Switch
    out QoS Res QoS                 // QoS Information on
                                    Connection Generation Result
};
```

Furthermore, the NML-CP 5 makes a request for processing toward the EML-CP 6 through the use of the aforesaid external interface.

With the above-described arrangement, in the network 10 to which the NML-CP 5 and EML-CP 6 according to the embodiment of this invention are applied, a connection between the communication terminals 1 meeting the QoS requirement can be set up in a manner that the NML-CP 5 and the EML-CP 6 operate as follows.

First, an operation of the whole network 10 will be described hereinbelow with reference to FIG. 6.

Figure 6:
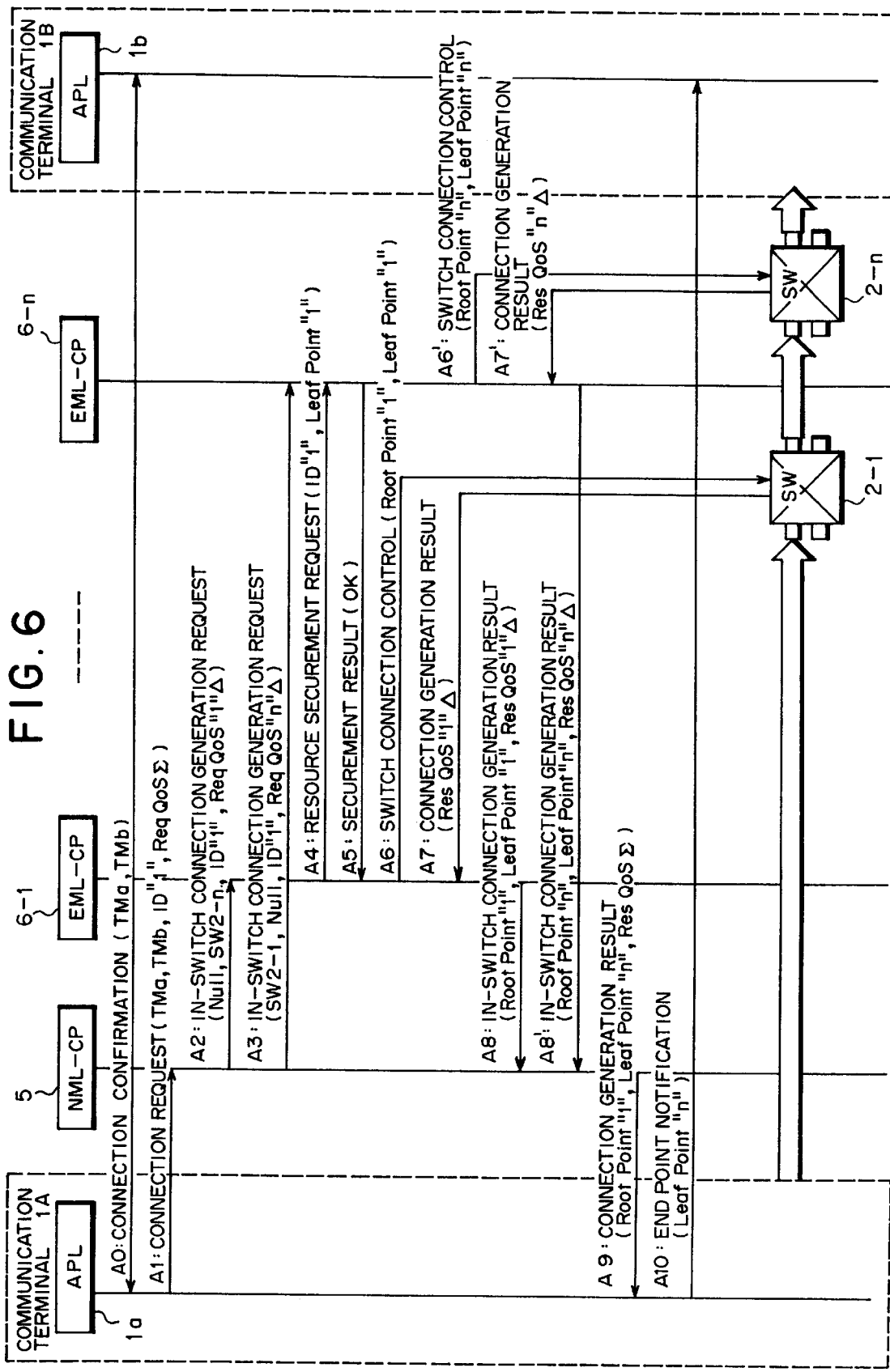
FIG. 6 is an illustration useful for explaining an operation of a network based upon the network monitoring control system and the element monitoring control systems according to the embodiment of this invention.

In FIG. 6, the connection-requesting side communication terminal and the connection-accepting side communication terminal are designated at numerals 1A and 1B, respectively, and the applications for actually conducting the communication processing in the communication terminals 1A, 1B are denoted at numerals 1a and 1b, respectively. Further, the switch accommodating the communication terminal 1A is represented at numeral 2-1 while the switch accommodating the communication terminal 1B is depicted at numeral 2-n (In the following description, the switch 2-n is taken as the switch adjacent to the switch 2-1). Still further, the EML-CP for monitoring and controlling the switch 2-1 is designated at numeral 6-1 while the EML-CP for monitoring and controlling the switch 2-n is denoted at numeral 6-n.

First of all, a connection confirmation is made between the connection-requesting side communication terminal 1A and the connection-accepting side communication terminal 1B [concretely, the processing to be conducted for informing the application 1a of the communication terminal 1A of identification information (TMb) of the communication terminal 1B] (step A0).

Subsequently, the connection-requesting side communication terminal 1A outputs, to the NML-CP 5, a connection setting processing request (connection request) including identification information on the connection-requesting side and connection-accepting side communication terminals 1A, 1B (TMa, TMb) and, further, including a QoS requirement on the connection to be set up (step A1).

At this time, in response to the connection setting processing request from the connection-requesting communication terminal 1A, the NML-CP 5 selects the switches 2-1, 2-n establishing a path for making the aforesaid connection on the basis of the identification information on the connection-requesting side and connection-accepting side communication terminals 1A, 1B included in this request.

Furthermore, the NML-CP 5 outputs, to the EML-CP 6-1 for monitoring and controlling the switch 2-1, an in-switch connection setting processing request (in-switch connection generation request) including identification information on the adjacent switch 2-n and a QoS requirement on the connection to be set up (step A2), and further, outputs, to the EML-CP 6-n for monitoring and controlling the switch 2-n, an in-switch connection setting processing request (in-switch connection generation request) including identification information on the adjacent switch 2-1 and the QoS requirement on the connection to be set up (step A3).

In answer to the aforesaid in-switch connection setting processing request, the EML-CP 6-1 for monitoring and controlling the switch 2-1 accommodating the connection-requesting communication terminal 1A secures the logical connection point L (leaf point LP; see FIG. 3) of the switch 2-1 needed for setting up the connection meeting the QoS requirement in cooperation with the EML-CP 6-n (steps A4, A5).

To put it concretely, the EML-CP 6-1 determines the candidate for the logical connection point L (leaf point LP) meeting the QoS requirement in the switch 2-1 and knows the EML-CP 6-n for monitoring and controlling the adjacent switch 2-n, and further, outputs, to this EML-CP 6-n, a request for securing a resource needed for setting up the connection (resource securing request) meeting the aforesaid QoS requirement (step A4).

Furthermore, in response to the resource securing request from the EML-CP 6-1, the EML-CP 6-n secures the logical connection point L of the switch 2-n to the logical connection point L being the candidate for the connection (root point RP; see FIG. 3) as a resource for making the connection meeting the QoS requirement, and when secured, informs the EML-CP 6-1 of the securement result (step A5).

Receiving the notification on the securement result from the EML-CP 6-n, the EML-CP 6-1 secures the logical connection point L being the candidate for the connection as the leaf point LP.

Still further, the EML-CPs 6-1, 6-n control the corresponding switches (switches 2-1, 2-n, respectively) to make the connection through the secured logical connection points L (leaf point LP, root point RP), thus establishing an in-switch connection SC (steps A6, A7 and steps A6', A7').

Moreover, each of the EML-CPs 6-1, 6-n outputs the in-switch connection SC setting control result (in-switch connection generation result) to the NML-CP 5 (steps A8, A8').

When receiving the in-switch connection SC setting control results from the EML-CPs 6-1, 6-n, the NML-CP 5 evaluates these results to judge whether or not it meets the QoS requirement included in the aforesaid connection setting processing request (whether or not meeting the QoS requirement) as a whole.

If is made that the aforesaid in-switch connection SC setting control results meet the QoS requirement included in the aforesaid connection setting processing request as a whole, the NML-CP 5 sets up the connection between the communication terminals 1A, 1B through the use of the logical connection points L secured in the switches 2-1, 2-n while outputting the connection setting result (connection result) to the communication terminal 1A (step A9).

Finally, the communication terminal 1A sends an end point notification (the notification on the connection setting result and the established logical connection points L) to the communication terminal 1B (step A10).

Besides, the NML-CP 5, if making an evaluation to that the aforesaid results do not meet the QoS requirement included in the aforesaid connection setting processing request as a whole, reselects the switches 2 setting up the aforesaid path and conducts the same processing as mentioned above to make the connection between the communication terminals 1A, 1B.

Although, in the above description, there are two switches, 2-1 and 2-n respectively, selected for the setting of the connection, if a plurality of switches 2 are selected, the NML-CP 5 receives the in-switch connection SC setting control results from all the EML-CPs 6 for monitoring and controlling the selected switches 2, and evaluates whether or not these results meet the QoS requirement included in the aforesaid connection setting processing request as a whole, thereafter setting up the connection between the communication terminals 1A, 1B.

Furthermore, referring to FIG. 7, a description will be made hereinbelow of an operation of the above-mentioned NML-CP 5.

When a connection setting processing request [end-end connection request including a QoS requirement (QoS condition)] is outputted from the application 1a of the communication terminal 1A (communication terminal 1) to the NML-CP 5, in the NML-CP 5, the in-network connection control section 11 receives this connection request (step B1).

Subsequently, the in-network connection control section 11 forwards a connection-target switch group selection request to the connection path determining section 13 in order to select the switches 2-1, 2-n (switches 2) constituting a connection path for making the connection. In response to this request, the connection path determining section 13 refers to the switch group physical connection information table 14 to select the switches 2-1, 2-n for establishing one connection path for the end-end connection on the basis of the identification information on the communication terminals 1A, 1B designated by the application 1a and the QoS requirement (QoS condition), and further, communicates the selection result to the in-network connection control section 11 (step B2).

In addition, the in-network connection control section 11 hands over a connection-target switch group connection request to the EML-CP managing section 12 on the basis of the selection result by the connection path determining section 13 (step B3).

The EML-CP managing section 12, receiving this request, transmits an in-switch connection setting request (connection-target switch group connection request) through the above-mentioned interface to the EML-CPs 6-1, 6-n (EML-CPs 6) for monitoring and controlling the switches 2-1, 2-n selected by the connection path determining section 13 (step B4).

Furthermore, the EML-CP managing section 12 receives, as a connection request result notification, the processing results (the in-switch connection setting results on the switches 2-1, 2-n) on the EML-CPs 6-1, 6-n sides to this request from the EML-CPs 6-1, 6-n (step B5), and hands over this connection request result notification to the in-network connection control section 11 (step B6).

The in-network connection control section 11 forwards the connection request result notification received in the step B6 and a QoS requirement evaluation request (QoS condition evaluation request) to the QoS control section 15 in order to integrally evaluate the in-switch connection setting results on the switches 2-1, 2-n. Upon receipt of this request, the QoS control section 15 integrally evaluates the in-switch connection setting results on the switches 2-1, 2-n on the basis of the connection request result notification in the step B6, and communicates the evaluation result to the in-network connection control section 11 (step B7).

Still further, the in-network connection control section 11 decides, on the basis of this evaluation result, whether or not there exists an interval (connection-disenabled interval) during which the in-switch connection is not set up (step B8). If a decision is made that the connection-disenabled interval exists, the in-network connection control section 11 again conducts the processing in the above-mentioned step B2 and in the subsequent steps (from step B8 through its YES route to step B2), and if the decision indicates no occurrence of the connection-disenabled interval, it sets up the connection between the communication terminals 1A, 1B through the in-switch connections in the aforesaid switches 2-1, 2-n and informs the application 1a of the communication terminal 1A of the end-end connection result (the completion of the connection) (from step B8 through its NO route to step B9).

Incidentally, the above-mentioned step B1 is the same processing as the step A1 in FIG. 6, the step B4 is the same processing as the steps A2, A3 in FIG. 6, the step B5 is equivalent in processing to the steps A8, A8' in FIG. 6, and the step B9 is equivalent in processing to the step A9 in FIG. 6.

Figure 8:
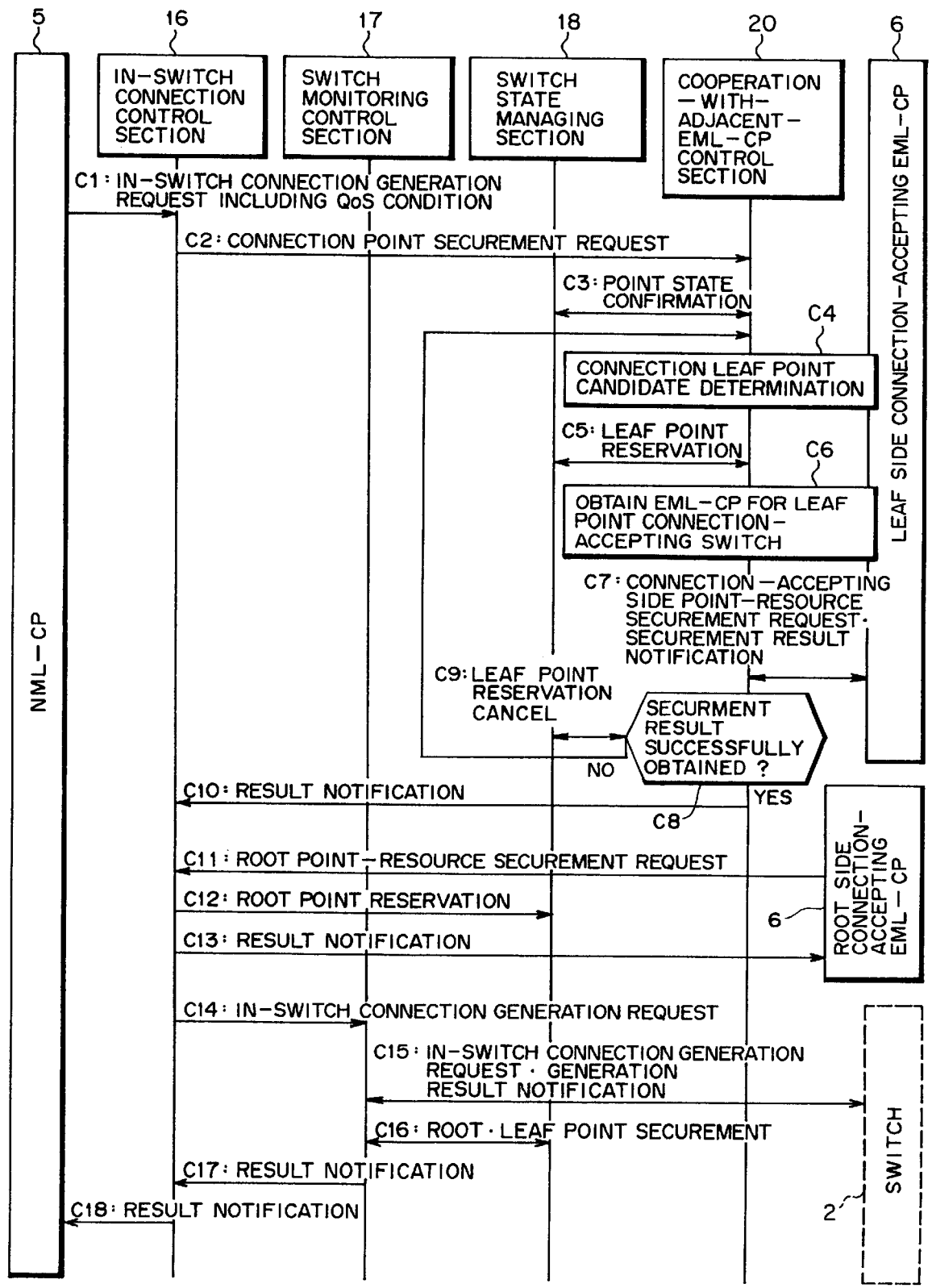
FIG. 8 is an illustration for describing an operation of the element monitoring control system.

Moreover, referring to FIG. 8, a detailed description will be given hereinbelow of the operation of the aforesaid EML-CPs 6-1, 6-n (EML-CPs 6). In the following description, let it be assumed that three or more switches 2 are selected for constituting the aforesaid path and three or more EML-CPs 6 are put in operation.

When the NML-CP 5 first issues an in-switch connection setting request [in-switch connection generation request including QoS request (QoS condition)], in the EML-CPs 6, the in-switch connection control section 16 receives this request (step C1).

Furthermore, the in-switch connection control section 16 outputs a connection point securement request to the cooperation-with-adjacent-EML-CP control section 20 to establish an in-switch connection meeting the QoS requirement (step C2).

Subsequently, upon receipt of this request, the cooperation-with-adjacent-EML-CP control section 20 issues a logical connection point state (point state) confirmation notification to the switch state managing section 18 in order to obtain a leaf point LP satisfying the QoS requirement in the switch 2 being controlled by the EML-CP 6 (step C3), and refers to the adjacent switch connection information table 19 and the state confirmation result on the logical connection point L by the switch state managing section 18 to determine the candidate for the leaf point LP meeting the QoS requirement (step C4), and further, issues a leaf point reservation notification to the switch state managing section 18 to make a reservation about a resource for this leaf point LP (step C5).

Furthermore, the cooperation-with-adjacent-EML-CP control section 20 additionally refers to the adjacent switch connection information table 19 to judge the EML-CP 6 for monitoring and controlling the connection-accepting side switch (adjacent switch) 2 to the leaf point LP forming the connection target candidate (step C6) (that is, the connection-accepting side EML-CP of the leaf side), and issues, to this EML-CP 6, a resource securement request which is for securing a resource needed for setting up a connection meeting the QoS requirement (connection-accepting side point resource securement request) to make a securement request for a resource for the connection-accepting side root point RP, thereby receiving a resource securement result from this EML-CP 6 (step C7).

Following this, the cooperation-with-adjacent-EML-CP control section 20 decides, on the basis of this securement result, whether the securement of the resource is successfully or unsuccessfully done (step C8). If it fails to secure the resource, the cooperation-with-adjacent-EML-CP control section 20 issues a leaf point reservation cancel notification to the switch state managing section 18 to cancel the reservation of the aforesaid leaf point LP (step C9), and again conducts the processing in the above-mentioned step C4 and in the subsequent steps (from step C8 through its NO route to step C4).

On the other hand, in the case of the successful resource securement, the cooperation-with-adjacent-EML-CP control section 20 returns, to the in-switch connection control section 16, a result notification indicative of the success of the resource securement as the processing result to the connection point securement request in the step C2 (step C10).

Meanwhile, the in-switch connection control section 16 receives a resource securement request, which is for securing a resource for setting up a connection meeting the QoS requirement (root point resource securement request), from the root side connection-accepting EML-CP 6 during the processing from the step C2 to the step C10 mentioned above (step C11).

Furthermore, upon receipt of this request, the in-switch connection control section 16 issues a root point reservation notification to the switch state managing section 18 to make a reservation about a resource for the root point RP (step C12), and communicates this reservation result to the root side connection-accepting EML-CP 6 (step C13).

Still further, at the time of the completion of the reservation about both the leaf point LP and root point RP, the in-switch connection control section 16 issues an in-switch connection generation request to the switch monitoring control section 17 (step C14). In answer to this request, the switch monitoring control section 17 issues an in-switch connection generation request to each of the switches 2 to control it, thus establishing the in-switch connection between the root point RP and the leaf point LP (step C15). Besides, the switch monitoring control section 17 issues a root and leaf point securement notification to the switch state managing section 18 for the purpose of changing the states of the root point RP and leaf point LP having been in the reserved condition to the states after the establishment of the in-switch connection (step C16).

Moreover, the switch monitoring control section 17 informs the in-switch connection control section 16 of the in-switch connection generation result (step C17), and finally, the in-switch connection control section 16 informs the NML-CP 5 of the in-switch connection setting result in the form of a result notification (step C18).

The above-described processing from the step C11 to the step C13 is the same as the processing in the leaf side connection-accepting EML-CP 6 in the step C7.

Figure 7:
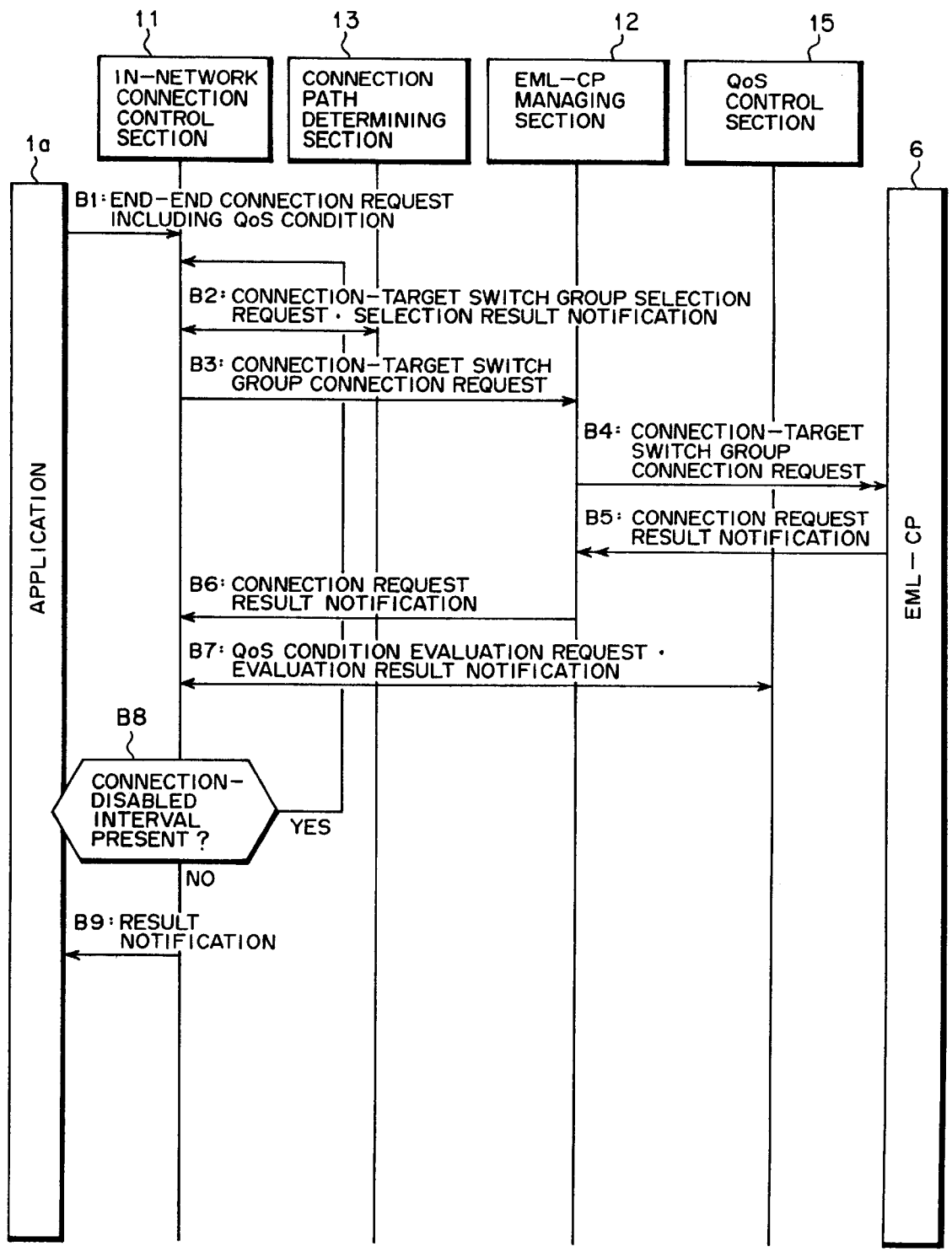
FIG. 7 is an illustration for describing an operation of the network monitoring control system.

Furthermore, the aforesaid step C1 is equivalent to the step B4 in FIG. 7 (that is, the steps A2, A3 in FIG. 6), the step C7 is equivalent to the steps A4, A5 in FIG. 6, the step C15 is the same as the steps A6, A7, A6', A7' in FIG. 6, and the step C18 is the same as the step B5 in FIG. 7 (that is, the steps A8, A8' in FIG. 6).

As described above, according to the network 10 to which the NML-CP 5 and EML-CP 6 according to the embodiment of this invention are applied, since the NML-CP 5 selects the switches 2 for constituting a path for making a connection while monitoring and controlling the whole network, the network resource can efficiently be put to use, and further, since the EML-CPs 6 for monitoring and controlling the switches 2 selected by the NML-CP 5 control the corresponding switches 2 in cooperation with each other, the parallel processing by the EML-CPs 6 is improvable, and the connection meeting the QoS requirement can be set up efficiently at a high speed.

That is, according to this network 10, since the EML-CPs 6 independently operable can concurrently conduct the processing for selecting the physical connection point P and logical connection point L in each of the switches 2, to be used for the connection, from a large number of existing connection points (physical connection points P and logical connection points L) meeting one connection generation request, the parallel processing is improvable, and the connection meeting the QoS requirement is efficiently achievable at a high speed.

Although, in the description of this embodiment, the functions of the NML-CP and the EML-CPs are distributively located in the network 10, an arrangement other than distributively locating all the functions of the NML-CP and the EML-CPs in the network 10 will also do. For instance, it is also acceptable that all the functions of the NML-CP and the EML-CPs are placed in one control system, or that only a portion of the functions of the NML-CP and the EML-CPs is put in one control system.

In addition, although, in this embodiment, each of the EML-CPs 6 is designed to monitor and control only one switch 2, it is also possible that the EML-CP 6 monitors and controls a plurality of switches 2.

What is claimed is:

1. A connection setting method for use in a network produced by interconnection among a plurality of element units accommodating communication terminals, wherein, for setting up a connection between the communication terminals, a network monitoring control system, for monitoring and controlling the whole network, selects two or more of said element units, constituting a path for setting up said connection, on the basis of a connection setting request information, including quality information about said connection to be set up and outputted from the communication terminal requesting said connection;

an element monitoring control system, for monitoring and controlling one of the selected element units as its object, under control of said network monitoring control system, secures a resource for setting up said connection in cooperation with an element monitoring control system for monitoring and controlling another one of the selected element units, forming a part of said path and is adjacent to said object element unit, and controls said object element unit through said resource for setting up said connection; and said network monitoring control system evaluates the result of connection setting control by said element monitoring control system to judge whether or not it meets said quality information as a whole.

2. A connection setting method for use in a network produced by interconnection among a plurality of element units accommodating communication terminals, wherein, for setting up a connection between said communication terminals, one of said communication terminals requesting said connection outputs, to a network monitoring control system for monitoring and controlling the whole network, connection setting request information, including identification information on said connection-requesting side communication terminal and another one of said communication terminals accepting said connection and further including quality information on said connection to be set up;

said network monitoring control system receives said connection setting request information, selects two or more of said element units, constituting a path for setting up connection, on the basis of said identification information on said connection-requesting side and connection-accepting side communication terminals, included in said connection setting request information, and outputs, to an element monitoring control system for monitoring and controlling one of the selected element units as its object, in-element-unit connection setting request information, including identification information on another one of the selected element units adjacent to said object element unit and quality information on said connection to be set up;

said element monitoring control system, for monitoring and controlling said object element unit, receives said in-element-unit connection setting request information from said network monitoring control system, secures a resource for setting up said connection corresponding to said quality information in cooperation with an element monitoring control system for monitoring and controlling the selected element unit constituting said path and adjacent to said object element unit, and controls said object element unit for setting up said connection through the secured resource; and said network monitoring control system receives the result of connection setting control by said element monitoring control units and evaluates the result of connection setting control to judge whether or not it meets the quality information as a whole.

3. A connection setting method for said network as defined in claim 1, wherein, if judgment is made that the result of connecting setting control by said element monitoring control systems does not wholly meet said quality information, said network monitoring control unit reselects element units constituting said path.

4. A connection setting method for said network as defined in claim 2, wherein, if judgment is made that the result of connecting setting control by said element monitoring control system does not wholly meet said quality information, said network monitoring control unit reselects element units constituting said path.

5. A network monitoring control system for wholly monitoring and controlling a network formed by interconnection among a plurality of element units accommodating communication terminals, said system comprising:

a connection setting request information receiving section for receiving connection setting request information, including identification information on one of said communication terminals requesting a connection to be set up and another one of said communication terminals accepting said connection and quality information on said connection from said connection-requesting side communication terminal;

a selecting section for selecting two or more of said element units, constituting a path for setting up said connection, on the basis of said identification information on said connection-requesting side communication terminal and said connection-accepting side communication terminal included in said connection setting request information received by said connection setting request information receiving section;

a request information outputting section for outputting, to an element monitoring control system for monitoring and controlling one of the element units selected by said selecting section as its object, in-element-unit connection setting request information, including identification information on another one of said selected element units adjacent to said object element unit and further including quality information on said connection to be set up; and an quality evaluating section for receiving a connection setting control result from said element monitoring control systems, which have received said in-element-unit connection setting request information from said request information outputting section, to make judgment whether or not said connection setting control result meets said quality information included in said connection setting request information as a whole.

6. A network monitoring control system as defined in claim 5, wherein said selecting section includes:

a physical connection information retaining table for retaining information on a physical connection relationship between said plurality of element units in said network; and a determining section for referring to said physical connection information retaining table on the basis of said identification information on said connection-requesting side and connection-accepting side communication terminals included in said connection setting request information for determining the element units to be selected, constituting said path for setting up said connection.

7. A network monitoring control system as-defined in claim 6, wherein said determining section determines said element units to be selected, taking into consideration a condition for determining said path.

8. A network monitoring control system as defined in claim 5, wherein, when said quality evaluating section makes judgment that said connection setting control result does not meet said quality information as a whole, said selecting section reselects element units constituting said path.

9. An element monitoring control system for, in a network formed by interconnection among a plurality of element units accommodating communication terminals, monitoring and controlling at least one of said plurality of element units as its object, said system comprising:

a request information receiving section for, in the case that said object element unit is selected as an element unit constituting a path for setting up a connection between said communication terminals, receiving, from a host system, an in-element-unit connection setting request information, including identification information on another one of the element units forming a part of said path and adjacent to the object element unit and further including quality information on said connection to be set up;

a resource securing section for securing a resource needed for setting up said connection, meeting said quality information, on the basis of said request information, received by said request information receiving section, in cooperation with the element monitoring control system for monitoring and controlling said adjacent element unit;

a connection setting control section for controlling said object element unit to set up said connection through the use of said resource secured by said resource securing section; and an informing section for informing said host system of the result of connection setting control by said connection setting control section.

10. An element monitoring control system as defined in claim 9, wherein said resource securing section includes:

an adjacent element unit connection information retaining table for retaining identification information on another one of the element units adjacent to said object element unit, identification information on said element monitoring control system for controlling said adjacent element unit and identification information on a connecting place for making a physical connection between said object element unit and said adjacent element unit;

a state managing section for grasping and managing a state of said object element unit;

a resource candidate determining section for referring to said adjacent element unit connection information retaining table and the result of management by said state managing section on the basis of said request information received by said request information receiving section to determine a candidate for a resource for setting up said connection corresponding to said quality information; and a cooperation-with-adjacent-element-unit control section for further referring to said adjacent element unit connection information retaining table on the basis of said request information received by said request information receiving section to determine an element monitoring control system capable of monitoring and controlling the adjacent element unit on the connection-accepting side and for determining a resource for setting up said connection corresponding to said quality information in cooperation with said adjacent element monitoring control system on the basis of the result of determination by said resource candidate determining section.

11. A computer-readable record medium retaining a network monitoring control program for wholly monitoring and controlling, through a computer, a network formed by interconnection among a plurality of element units accommodating communication terminals, said network monitoring control program making said computer function as:

a connection setting request information receiving section for receiving connection setting request information, including identification information on one of said communication terminals requesting a connection and on another one of said communication terminals accepting said connection and quality information on said connection to be set up from said connection-requesting side communication terminal;

a selecting section for selecting two or more of said element units constituting a path for setting up said connection on the basis of said identification information on said connection-requesting side communication terminal and connection-accepting side communication terminal included in said connection setting request information received by said connection setting request information receiving section;

a request information outputting section for outputting, to an element monitoring control system for monitoring and controlling one of said element units selected by said selecting section as its object, in-element-unit connection setting request information, including identification information on another one of said selected element units adjacent to said object element unit and further including quality information on said connection to be set up; and an quality evaluating section for receiving a connection setting control result from said element monitoring control systems, which have received said in-elementunit connection setting request information from said request information outputting section, to make judgment whether or not said connection setting control result meets said quality information included in said connection setting request information as a whole.

12. A computer-readable record medium retaining an element monitoring control program for, in a network formed by interconnection among a plurality of element units accommodating communication terminals, monitoring and controlling, through a computer, at least one of said plurality of element units as its object, said element monitoring control program making said computer function as:

a request information receiving section for, in the case that said object element unit is selected as an element unit constituting a path for setting up a connection between said communication terminals, receiving, from a host system, an in-element-unit connection setting request information, including identification information on another one of the element units forming a part of said path and adjacent to said object element unit and further including quality information on said connection to be set up, a resource securing section for securing a resource needed for setting up said connection, meeting said quality information, on the basis of said request information, received by said request information receiving section, in cooperation with the element monitoring control system for monitoring and controlling said adjacent element unit, a connection setting control section for controlling said object element unit to set up said connection through the use of said resource secured by the resource securing section; and an informing section for informing said host system of the result of connection setting control by said connection setting control section.

* * * * *